INVENTOR.
CLIFFORD E. HALE

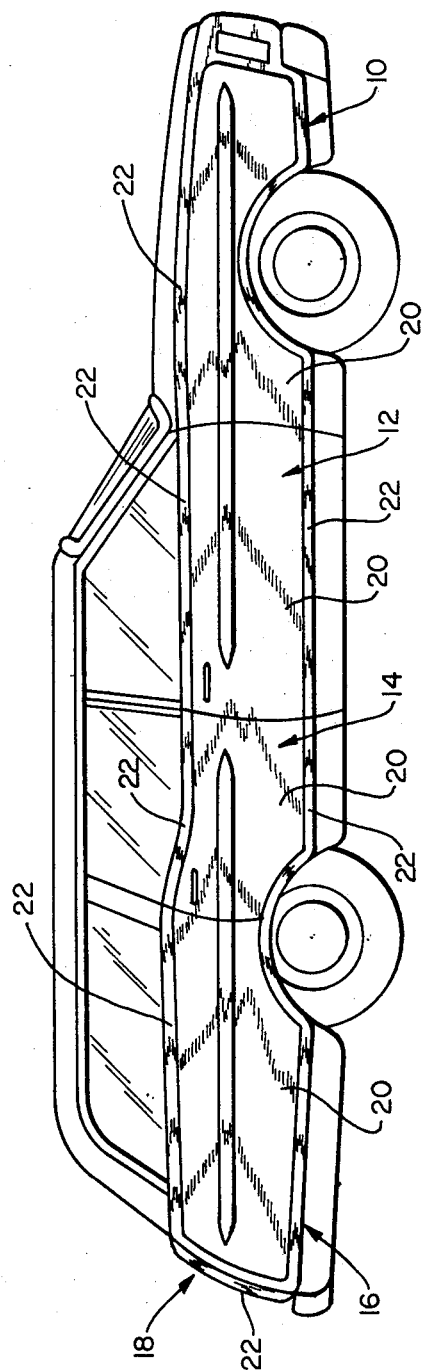

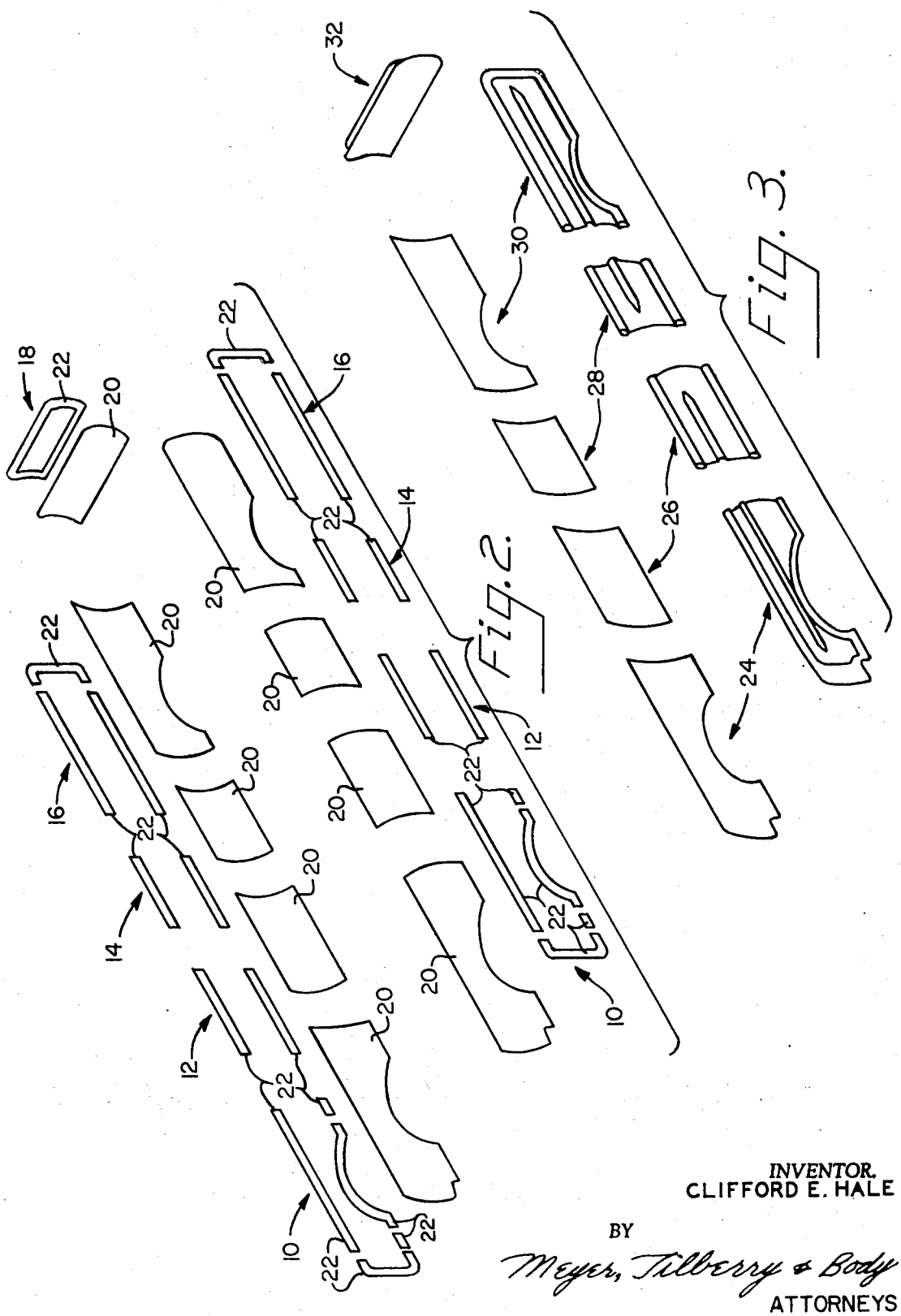

BY
*Meyer, Tilberry & Body*
ATTORNEYS.

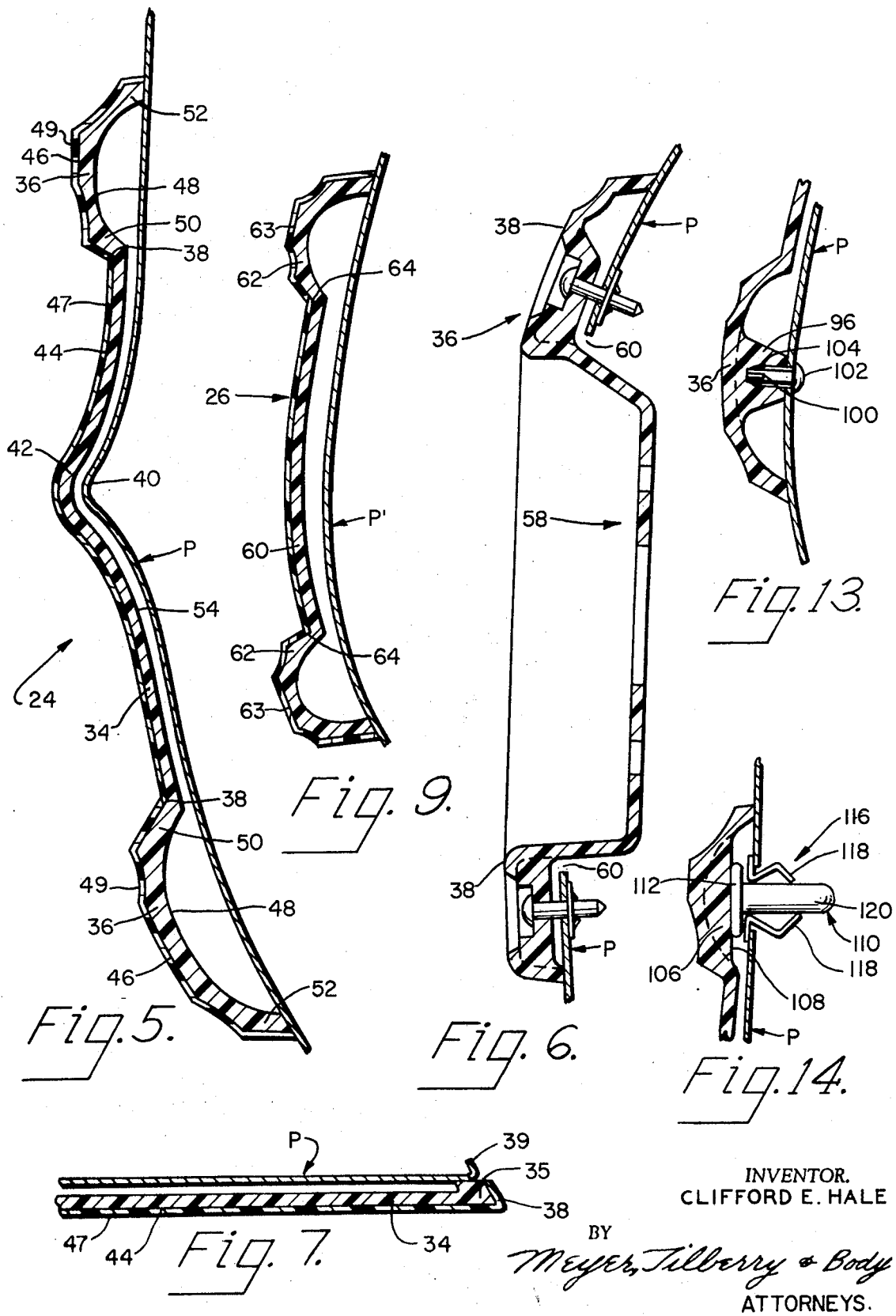

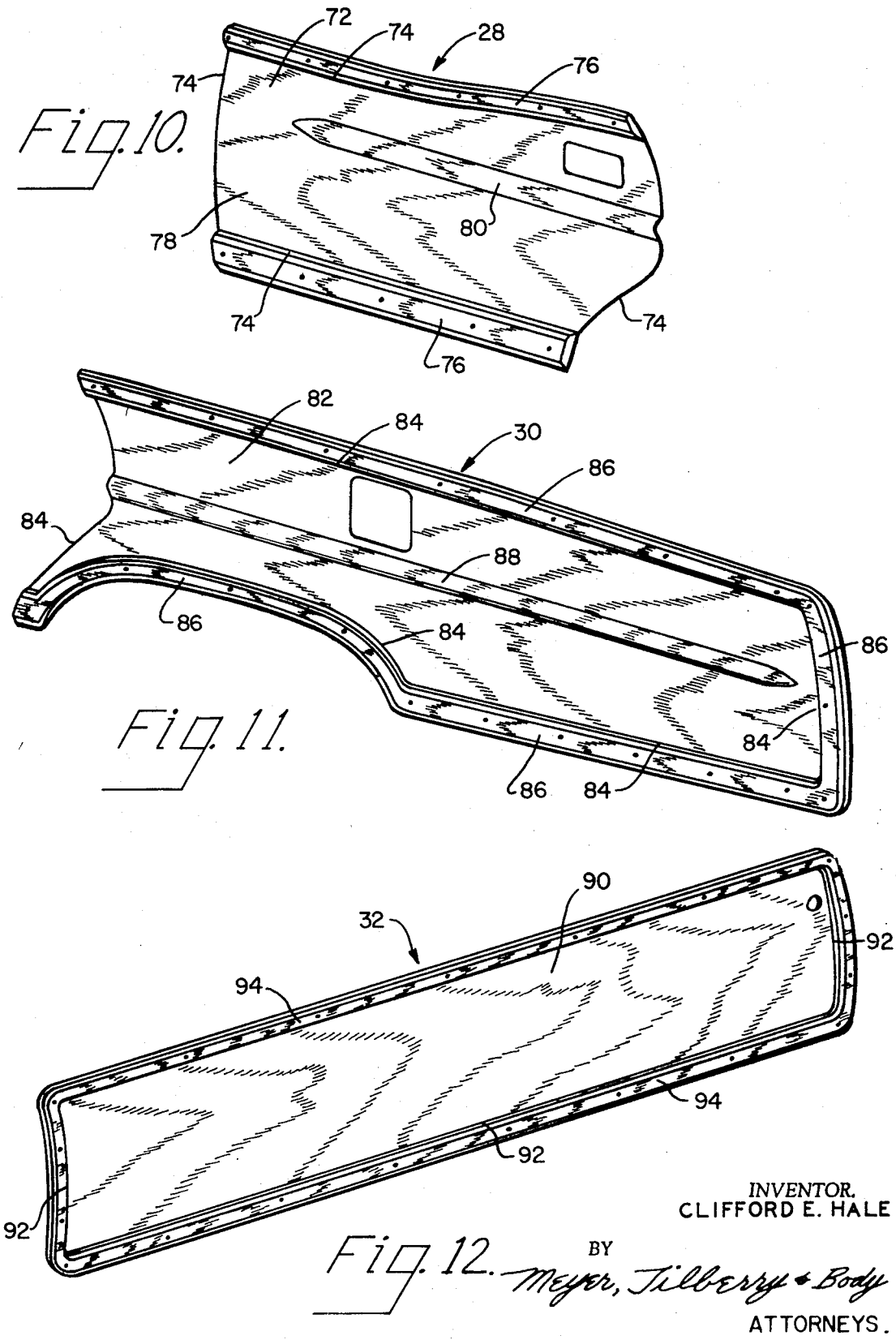

United States Patent Office 3,709,770
Patented Jan. 9, 1973

3,709,770
DECORATIVE EXTERIOR PANEL SYSTEM FOR AUTOMOBILES
Clifford E. Hale, Ann Arbor, Mich., assignor to Gulf + Western Industrial Products Company, Grand Rapids, Mich.
Filed June 16, 1971, Ser. No. 153,894
Int. Cl. B32b 1/04, 3/02
U.S. Cl. 161—44         23 Claims

ABSTRACT OF THE DISCLOSURE

Trim panel structures are disclosed of the character adapted to be mounted on the exterior surfaces of vehicle panels such as fender, door, quarter and tailgate panels of a station wagon to provide the vehicle exterior with a wood panel and border appearance. Each trim panel is defined by a sheet of thermoplastic material formed to define integral panel and border portions having decorable outer surfaces. The outer periphery of the trim panel corresponds in contour generally to the outer periphery of the vehicle panel to which it is to be attached, and decorative means is applied to the decorable outer surfaces of the panel and border portions to provide for the panel portion to have a wood panel appearance and to provide for the border portion to have a wood grained appearance contrasting in color with the panel portion.

---

The present invention relates to trim structures and, more particularly to trim panels adapted to be mounted in overlying relationship with the exterior surface of a vehicle panel to provide the vehicle panel with a desired decorative appearance.

Certain vehicles have been provided heretofore with decorative exterior surface means which provides for the corresponding portion of the vehicle to appear to be constructed from thin wooden panels bordered peripherally by wood strips which contrast in color to the color of the wood of the panel. The most prominent of such vehicles is the class known generaly as station wagons. The term station wagon defines a class of passenger type vehicles having a body design which includes, generally, front fender, front door, rear door and rear quarter panels on each side of the vehicle and a tailgate panel extending across the rear of the body and which is generally interconnected therewith to define a rear opening into the vehicle. Certain station wagons have been provided in the past wherein the fender, door, quarter and tailgate panels are provided with means to give these panels the appearance of being constructed of or covered with thin sheets of wood of one color, such as walnut or teak, bounded peripherally by wood strips of a contrasting color such as that of maple wood. Years ago such a decorative appearance was achieved by applying wood veneer and wood border strips to the vehicle panels. More recently, such decorative appearance had been achieved by use of materials simulating wood grain in appearance. More particularly, the wood panel effect had been provided by adhering a thin film of plastic material to the vehicle panel and the wood border strip effect has been provided by attaching separate molding strips of plastic or metal around the periphery of the panel films. Such molding strips are made by compression molding or stamping the material thereof, and the outer surfaces of the moldings are covered with a preprinted film to provide the desired wood grain appearance.

While the use of simulated wood panel and border trim has received acceptance from the automotive industry and consumers, there are several disadvantages attendant to the production and installation of such trim structures heretofore known. In this respect, the panel film must be adhesively applied to the vehicle body panel and heat cured. Such heat curing requires the provision of curing ovens along the vehicle assembly line for curing the adhesive film. Further, the separate border or molding define a plurality of variously contoured strip segments which increases the number of component parts to be fabricated, handled and installed. It will be appreciated, therefore, that installation time is considerably long in that these molding parts have to be individually attached to the vehicle panel. A panel and molding assembly of the foregoing character may, for example, involve the use of as many as 34 individual pieces in providing one station wagon with trim assemblies on two front fenders, two front doors, two rear doors, two quarter panels and a tailgate.

The present invention advantageously overcomes the disadvantages of such trim structures heretofore known including those disadvantages specifically pointed out hereinabove. In this respect, in accordance with the present invention a trim panel structure is provided for mounting on the exterior surface of a vehicle panel as a unitary panel component including a panel portion and a border portion. The trim panel is fabricated to completion including the provision of the outer surfaces of the panel portion and border portion with decorative surface means simulating a desired wood grain. The completed panel has a peripheral contour corresponding to that of the vehicle panel on which it is to be mounted. Accordingly, the completed panel is ready for installation and installation is quickly achieved by positioning the trim panel relative to the vehicle panel and interconnecting the two panels such as by the use of cooperable fastener means therebetween.

Further, in accordance with the present invention, an entire trim panel assembly for a station wagon is defined by nine parts in the form of nine trim panel components corresponding to the nine panels of the vehicle to be covered, namely the two front fenders, two front doors, two rear doors, two quarter panels and tailgate. It will be appreciated, therefore, that a considerable reduction is realized with regard to the number of parts to be tooled, handled and installed and with regard to the time required to achieve installation. Further, the reduction in installation steps provides for shortening the assembly line in a body assembly plant, as does the elimination of body line curing ovens for curing adhesive films heretofore applied to the vehicle panels.

In accordance with a narrower aspect of the present invention, the trim panel unit is in the form of a one piece plastic structure which is sheet or plate-like in cross sectional thickness and which is contoured so as to define a panel portion and integral border or molding portions. The trim panel may be formed in any suitable manner and from any suitable material and may, for example, be formed of a thermoplastic material formed under heat and pressure to achieve the desired configuration thereof. The wood grain appearance for the trim panel may be applied or provided in any suitable manner. For example, the outer surfaces of the panel and border portions can be provided with a grain configuration by impression during the molding thereof under heat and pressure. Such graining effect can be achieved, for example, by fabricating the trim panel in a mold having an electro-formed nickel surface for graining the thermoplastic material. The wood grained outer surfaces of the panel portion and border portion are then finished by painting and ink-wiping to achieve the wood color and to accent the grain appearance. The wood finish may also be provided by applying preprinted plastic film to the outer surfaces of the panel portion and border portion. Still further, the wood finish can be provided by employing distortion printed extruded panel blanks which are formed under heat and pressure to the desired contour to define a completely finished panel ready for installation. It will be appreciated that the provision of a one piece trim panel component provides for a more efficient fabrication of parts necessary to provide a vehicle such as a station wagon with a decorative wood panel effect.

An outstanding object of the present invention is the provision of a unitary trim panel particularly suited for mounting on an exterior surface of a vehicle panel.

Another object of the present invention is the provision of a panel of the above character which includes unitary panel and border portions, whereby the panel is mountable as a unit on a vehicle panel.

Another object of the present invention is the provision of a trim panel of the above character wherein the outer surfaces of the panel portion and border portion are decorable, whereby the panel, when mounted, is adapted to provide the vehicle with a desired decorative appearance.

Still another object of the present invention is the provision of a trim panel of the above character wherein the outer surfaces of the panel portion and border portion are provided with decorative means simulating wood grain, whereby said trim panel provides said vehicle with a wood paneling and wood border appearance.

A further object of the present invention is the provision of a trim panel of the above character which is more efficient and economical to fabricate and install than trim assemblies heretofore known.

The foregoing objects, and others, will in part be obvious and in part more fully pointed out hereinafter in conjunction with the description of the drawing of preferred embodiments of the present invention and in which:

FIG. 1 is a side elevational view of a station wagon vehicle having decorative wood grain trim thereon;

FIG. 2 is an exploded perspective view illustrating the components heretofore required to provide a station wagon type vehicle with a wood paneling effect;

FIG. 3 is an exploded perspective view illustrating the components required to provide a station wagon vehicle with a wood paneling and border effect in accordance with the present invention;

FIG. 5 is a sectional view of the front fender trim panel taken along 5—5 in FIG. 4 and illustrating the disposition of the trim panel relative to an underlying vehicle panel;

FIG. 6 is a cross-sectional view of the front fender panel taken along line 6—6 in FIG. 4;

FIG. 7 is a cross-sectional view of the front fender trim panel taken along line 7—7 in FIG. 4;

FIG. 9 is a cross-sectional elevation view of the front door trim panel taken along line 9—9 in FIG. 8, and illustrating the relationship of the trim panel to an underlying vehicle door panel;

FIG. 10 is a perspective view of a rear door trim panel in accordance with the present invention;

FIG. 11 is a perspective view of a rear quarter trim panel in accordance with the present invention;

FIG. 12 is a perspective view of a tailgate trim panel in accordance with the present invention;

Figure 4:
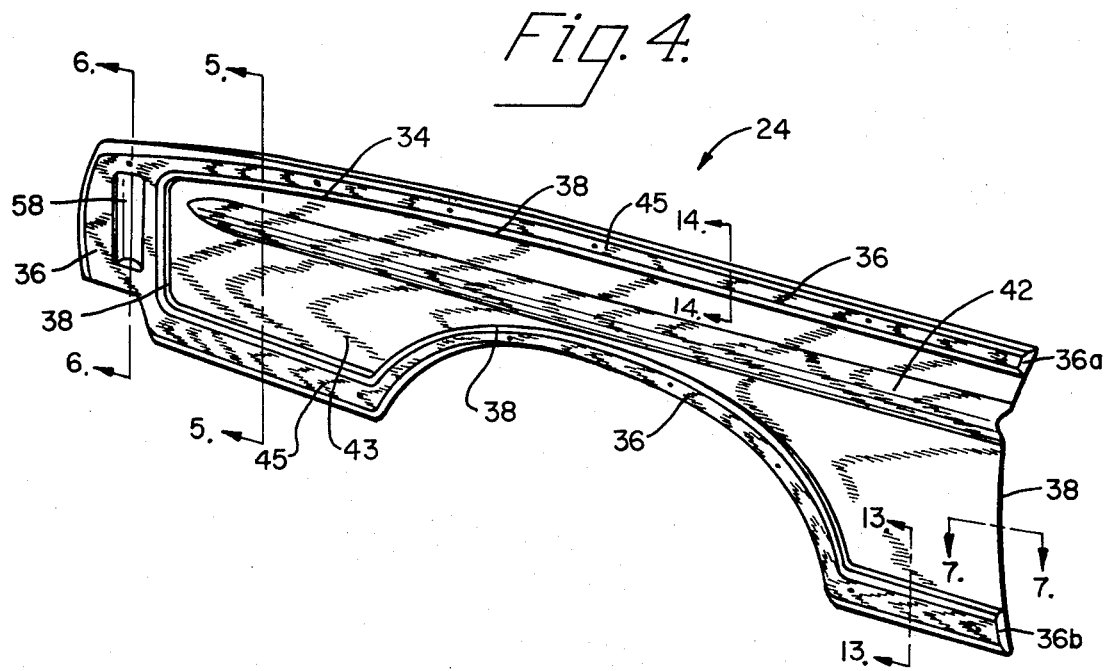
FIG. 4 is a perspective view of a front fender trim panel in accordance with the present invention.

FIG. 13 is a view in cross section of a lower border portion of the front fender trim panel taken along line 13—13 in FIG. 4 and illustrating fastening means between the border portion and the underlying vehicle panel; and FIG. 14 is a cross-sectional view of an upper border portion of the front door trim panel taken along line 14—14 in FIG. 4 and illustrating another form of fastening means between the border portion and underlying vehicle panel.

Referring now to the drawings in greater detail wherein the showings are for the purpose of illustrating the preferred embodiments of the invention only and not for the purpose of limiting the same, a station wagon type vehicle is illustrated in FIG. 1. The vehicle includes, on opposite sides thereof, simulated wood paneling trim assembly means including front fender trim means 10, front door trim means 12, rear door trim means 14 and and rear quarter trim means 16. Further, the vehicle includes tailgate trim means 18. Each trim assembly includes a simulated wood panel portion 20 and corresponding simulated wood border or molding components 22. On the vehicle sides, border components 22 together define a peripheral border or molding extending about the several panel portion 20. A border component 22 similarly defines a peripheral border extending about the panel portion associated with the tailgate, which panel portion is not illustrated. The panel portion and border components defining, for example, front fender trim means 10 has a peripheral contour corresponding substantially to the vehicle panel on which it is mounted, namely the front fender panel of the vehicle. Trim means 12, 14, 16 and 18 similarly have the peripheral contour conforming substantially to that of the corresponding underlying vehicle panel.

Heretoforce, the provision of a vehicle such as that illustrated in FIG. 1 with decorative trim to give the vehicle a wood panelled effect involved the application of as many as 34 separate component parts to the vehicle panels. For example, with reference to FIG. 2 of the drawing, a front fender trim assembly 10 included a sheet of plastic defining the corresponding panel portion 20 and five separate molding pieces 22 which together define the corresponding border portion. Similarly, front and rear door trim means 12 and 14 required application of corresponding panel films defining portions 20 and two molding components 22, and rear quarter panel trim means 16 required the application of a corresponding panel film and three separate molding pieces. Tailgate trim means 18 required the application to the vehicle tailgate panel of a corresponding panel film and a separate molding piece.

In accordance with the present invention, the desired wood panel trim effect is achieved by application of but nine trim panel units to the vehicle panels. More particularly, with reference to FIG. 3 of the drawing, the complete trim panel assembly for a station wagon vehicle is defined by a pair of trim panels 24 for the front fender panels of the vehicle, a pair of trim panels 26 for the front door panels of the vehicle, a pair of trim panels 28 for the rear door panels of the vehicle, a pair of trim panels 30 for the rear quarter panel of the vehicle, and a trim panel 32 for the tailgate of the vehicle. In addition to the reduction of the number of parts which have to be produced, it will be appreciated that the present invention provides for a reduction in assembly time by reducing the number of individual components which have to be attached to the several vehicle panels.

The structure of a front fender trim panel 24 is illustrated in FIGS. 4-7 of the drawing. More particularly, a left front fender trim panel is illustrated in FIG. 4 and it will be appreciated that the corresponding right front fender trim component will be of a mating structural configuration. Trim panel 24 is in the form of unitary panel and border means including panel means 34 and border means 36. Panel means 34 has a peripheral edge 38 contoured to correspond generally to the peripheral contour of the front fender panel of the vehicle, and border means 36 extends along at least a portion of peripheral edge 38 and has an outer peripheral edge corresponding in contour generally with that of the vehicle panel. With regard to the front fender trim panel, border means 36 extends along the upper and lower portions of peripheral edge 38 and along the front portion of peripheral edge 38.

As will be seen in FIG. 5 panel portion 34 has a cross-sectional contour which corresponds substantially to that of the underlying vehicle panel P which in this instance, of course, is the front fender panel of the vehicle. In the particular embodiment illustrated, vehicle panel P has a longitudinally extending raised portion 40 and a panel portion 34 has a corresponding longitudinally extending raised portion 42. The cross-sectional contour of vehicle panel P may, of course, be of any desired form, the longitudinal rib contour defined by raised portion 40 merely being illustrative of one such form. Panel portion 34 has a decorable outer surface 44 within peripheral edge 38 thereof and which surface is adapted to receive decorative means as set forth more fully hereinafter.

Border means 36 is adapted to provide panel means 34 with a border or molding having the appearance of wood extending about the panel portion and extending outwardly from the underlying vehicle panel a distance greater than that of the panel portion. In the particular embodiment illustrated, border means 36 has a generally convex configuration in cross-section relative to panel means 34 and includes a decorable outer surface 46 which extends upwardly from outer surface 44 along peripheral edge 38 and thence outwardly of panel portion 34 and rearwardly toward vehicle panel P. Outer surface 46 may be given any desired cross-sectional contour and, like decorable surface 44, is adapted to be provided with decorative meanse in the manner set forth more fully hereinafter.

Preferably panel means 34 and border means 36 are of sheet-like material having a generally uniform thickness in cross-section. A material thickness of about 0.090 inch has been found to be satisfactory, but it will be appreciated that other thicknesses can be employed. Thus, border means 36 is provided with a concave inner surface 48 providing the border means with a channel shaped cross-sectional contour defined by leg portion 50 integral with panel portion 34 along peripheral edge 38 and outer leg portion 52 which engages the vehicle panel P. Preferably, leg portion 52 is of a length which provides for the inner surface 54 of panel means 34 to be spaced from the outer surface 56 of vehicle panel P. The space or clearance between surfaces 54 and 56 prevents the existence of an area between the trim panel and vehicle panel in which moisture or liquid can collect and cause rusting of the vehicle panel. The space also provides for accommodating variance from manufacturing tolerances with respect to the vehicle panel which might otherwise make mounting of the trim panel difficult. The clearance dimension preferably is about 0.09 inch, but it will be understood that this dimension is variable. Moreover, it will be appreciated that trim panels can be made in accordance with the present invention without providing for such spacing.

As mentioned hereinabove, panel means 34 and border means 36 define unitary panel and border means for the trim panel component. The trim panel may be produced from any suitable material and, preferably, is produced from a plastic material. The plastic material may be a thermosetting plastic or a thermosplastic material. A preferable thermoplastic material is a glass fiber reinforced polypropylene, but it will be appreciated that unreinforced polypropylene can be used as well as other plastic materials such as ABS or vinyl, for example. Further, the trim panel preferably is produced by molding the plastic material under heat and pressure to define the peripheral edge of the panel portion. The use of a plastic material in producing the trim panel and the forming thereof by the use of suitable mold means provides for the trim panel component to be in a form, after molding, wherein it is only necessary to provide the decorative means on the outer surfaces of the panel portion and border portion to complete the panel unit for installation. Moreover, by molding the trim panel component, the panel can be provided with integral components such as cavity means 58 in the front portion of trim means 36, which cavity means defines a recess for a front fender sidelight, or the like, for the vehicle. As illustrated in FIG. 6, vehicle panel P is provided with an opening 60 adapted to receive recess means 58. Thus, the provision of the vehicle with a sidelight merely requires the mounting of the light fixture within the recess and the provision of the recess with suitable cover means.

FIG. 7 illustrates the structural configuration of panel means 34 along the vertical rear portion of peripheral edge 38 of the panel means. The corresponding vertical edge of the underlying vehicle panel P is defined at this point by an inturned flange 39 and the inner surface of panel means 34 is provided with projection means 35 which engages the outer surface of vehicle panel P so as to support peripheral edge 38 of panel means 34 in spaced relationship from vehicle panel P along this portion of peripheral edge 38. Preferably, projection means 35 extends continuously between the upper and lower portions of border means 36 so as to provide the rear portion of the trim panel with a neat appearance along this edge. Further in this regard, the rear portions of the upper and lower portions of channel shaped trim means 36 preferably are closed by integral wall means 36a and 36b, respectively, to add to the panel appearance.

As mentioned hereinabove, outer surfaces 44 and 46 of panel means 34 and border means 36, respectively, are decorable surfaces adapted to receive decorative means to provide the panel portion and border portion with wood grain patterns 43 and 45, respectively, simulating a panel of wood bordered by a wood strip. Generally, the panel portion has a dark appearance such as that of walnut or teak wood and the border portion has a light appearance such as that of maple wood. The desired wood grain appearance can be provided on outer surfaces 44 and 46 in a number of different ways. For example, the outer surfaces of the panel portion and border portion may be impressed during forming of the trim panel unit to provide a wood grain pattern in the outer surface of the plastic material. After the trim panel unit has been formed, a base color coat or coats of paint are applied to the panel portion and border portions having a color corresponding to the color of the wod which they are to simulate. An ink darker than the particular base paint is then applied to the panel portion and border portions to fill the grain impressions, and the excess ink is wiped off leaving ink in the depressions, thus to accentuate the grain pattern. Thereafter, a sealing or barrier coat may be applied to the outer surfaces of the panel portion and border portion to protect the decorated surface.

The wood grain effect may also be achieved by applying preprinted film to the panel portion and border portions, such as is illustrated by films 47 and 49, respectively, in FIG. 5. Preprinted plastic film having a wood grain appearance is, of course, well known and application thereof to surfaces 44 and 46 can be achieved in any suitable manner such as by adhesive bonding. Such films may be of any suitable material such as ABS or vinyl.

Yet another method of providing the wood grain appearance would be to produce the trim panel blanks in the form of extruded sheets. An outer surface of such sheets would then be distortion printed to provide a distorted wood grain pattern thereon. The blanks would then be shaped or formed to the trim panel configuration under heat and pressure, which forming would displace the distorted pattern to the desired configuration to complete the trim panel component to a form ready for installation on the vehicle panel. It will be appreciated that other methods may be employed to provide the wood grain appearance desired for the trim panel components.

Figure 8:
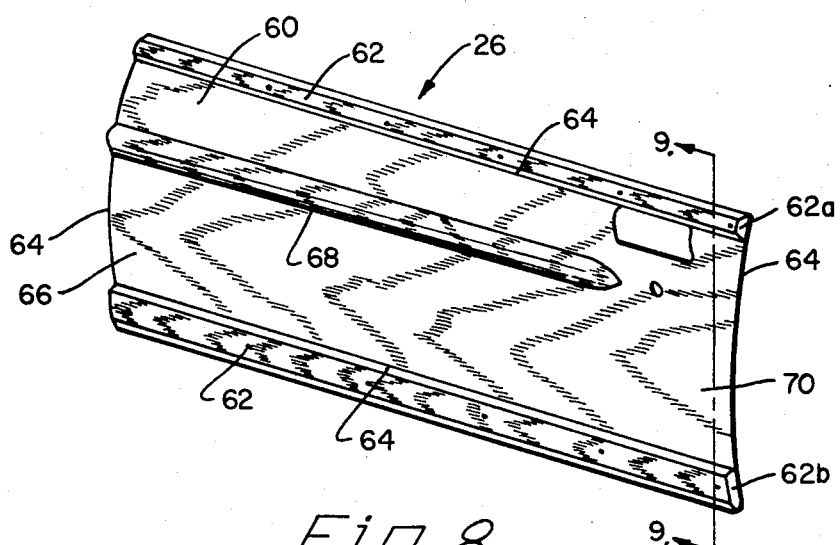
FIG. 8 is a perspective view of a front door trim panel in accordance with the present invention.

The trim panel component 26 for the left front door panel of the vehicle is illustrated in FIGS. 8 and 9 of the drawing. Trim panel 26 is similar to trim panel 24 and in this respect includes unitary panel and trim means including panel means 60 and trim means 62. Panel means 60 has a peripheral edge 64 and trim means 62 extends along a portion of peripheral edge 64, in this instance along the upper and lower portions of the peripheral edge. The cross-sectional configuration of trim panel 26 adjacent the front end 66 thereof corresponds to the cross-sectional configuration of the rear portion of trim panel 24. In this respect, trim panel 26 includes a longitudinally extending rib portion 68 similar in cross-section to rib portion 42 of trim panel 24. Rib portion 68 terminates short of the rear edge of trim panel 26, whereby the rear portion 70 of trim panel 26 has the cross-sectional configuration illustrated in FIG. 9. Thus, rear portion 70 of panel means 60 of trim panel 26 has an arcuate contour corresponding to the contour of underlying vehicle door P'.

In all other respects, trim panel 26 corresponds to trim panel 24. In this regard, panel means 60 has a decorable outer surface 61 and border means 62 has a convex decorable outer surface 63. Surface 63 corresponds in contour to outer surface 46 of border means 36 of trim panel 24 and border means 62 has a concave inner surface which provides the border means with a channel shaped cross-section. Still further, the outer legs of the border channels extend towards vehicle panel P' to the extent that the inner surface of panel portion 60 is spaced from the outer surface of vehicle panel P'. In a manner similar to border means 36 of trim panel 24, border means 62 is closed at the opposite ends thereof such as by integral end wall means 62a and 62b. The decorable outer surfaces of the panel means and border means will, of course, be provided with decorative means to provide the trim panel with a wood grain effect corresponding to that of the panel portion and border portion of trim panel 24.

The left rear door trim panel 28 is illustrated in FIG. 19. Trim panel 28, in a manner similar to trim panels 24 and 26, includes panel means 72 having a peripheral edge 74 which corresponds substantially to the peripheral contour of the underlying vehicle panel, in this instance the rear door panel of the vehicle. Trim panel 28 further includes border means 76 extending along a portion of peripheral edge 74 and, in this instance, along the upper and lower portions of peripheral edge 74. Further, front portion 78 of trim panel 28 has a cross-sectional configuration corresponding with that of rear portion 70 of trim panel 26 and, in the embodiment illustrated, trim panel 28 is provided with a longitudinally extending raised portion 80 similar to raised portions 42 and 68 of trim panels 24 and 26, respectively. Panel means 72 and border means 76, of course, have decorable outer surfaces of the character hereinabove described with regard to trim panel 24 and these outer surfaces are provided with decorative means, whereby trim panel 28 has a wood grain appearance corresponding with that of panels 24 and 26.

The left rear quarter trim panel 30 for the vehicle is illustrated in FIG. 11 of the drawings. In a manner similar to the trim panels described hereinabove, trim panel 30 includes panel means 82 having a peripheral edge 84 which corresponds in contour generally to the peripheral contour of the underlying vehicle panel, in this instance the left rear quarter panel of the vehicle. Trim panel 30 further includes border means 86 extending along a portion of peripheral edge 84 and, in this instance, along the upper, lower and rear portions of peripheral edge 84. The front portion of peripheral edge 84 corresponds with the rear portion of peripheral edge 74 of rear door trim panel 28 and panel means 82 is provided with a raised longitudinally extending rib portion 88 which extends from the front portion of peripheral edge 84 towards the rear portion of the peripheral edge. It will be appreciated that the cross-sectional configuration of trim panel 30 adjacent the front portion of peripheral edge 84 corresponds to the cross-sectional configuration of the rear door trim panel 28 adjacent the rear portion of peripheral edge 74 of panel means 72. The outer surfaces of panel means 82 and border means 86 in a manner similar to the corresponding portions of trim panels 24, 26 and 28, are decorable surfaces which are provided with decorative means so that trim panel 30 has a wood grain effect corresponding with that of panels 24, 26 and 28.

Tailgate trim panel 32 is illustrated in FIG. 12 of the drawing. Trim panel 32 includes panel means 90 having a peripheral edge 92 corresponding in contour generally to the contour of the tailgate panel of the vehicle. Further, the trim panel includes border means 94 which, in this instance, extends along peripheral edge 92 around the entire periphery of panel means 90. The cross-sectional configuration of tailgate trim panel 32 is not illustrated, but it will be appreciated that the cross-sectional structure thereof is such that panel means 90 conforms generally to the contour of the outer surface of the underlying tailgate panel of the vehicle and is spaced therefrom by providing for the outer legs of border means 94 to be of an extent to assure such spacing when the outer legs of the border means engage the outer surface of the vehicle tailgate panel. Further, it will be appreciated that the outer surfaces of panel means 90 and border means 94 define decorable surfaces in a manner similar to that hereinabove described, and that these outer surfaces are provided with decorative means so that the tailgate panel has a wood grain effect corresponding to that of trim panels 24, 26, 28 and 30.

Trim panels 24, 26, 28, 30 and 32 may be mounted on the corresponding underlying vehicle panel in any suitable manner such as by the use of cooperable fastener means. For example, with reference to FIG. 13 of the drawing, the inner surface of the lower border portion of border means 36 of trim panel 24 is illustrated as being provided at a point along the length thereof with an integral boss 96 extending toward the underlying vehicle panel P. Boss 96 is provided with a recess 100 adapted to receive the shank portion of a headed fastener element 102. The shank portion of fastener 102 may be provided with barb means 104 adapted to engage the surface of recess 100 in a manner whereby withdrawal of the fastener is restrained. It will be appreciated too that the shank portion of fastener 102 could be provided with thread means adapted to cooperate with the inner surface of recess 100 to hold the trim panel in place relative to vehicle panel 98.

A further example of fastener means is illustrated in FIG. 14. In this instance, the inner surface of the upper border portion of border means 36 of trim panel 24 is provided at a point along its length with boss means 106 having a flat surface 108. A plastic fastener element 110 is suitably secured to surface 108 of boss means 106 such as by spin welding head 112 of the fastener to surface 108. The underlying vehicle panel P is provided with an opening which carries a resilient steel clip 116 having a pair of opposed legs 118 adapted to receive and frictionally engage shank portion 120 of fastener element 110 therebetween.

It will be appreciated that several fastener elements will be employed about each trim panel and that the same or different forms of fasteners may be employed along the top and bottom portions of the border means. Further, many types of fastener elements may be employed to achieve mounting of the trim panels to an underlying vehicle panel and, moreover, it will be appreciated that means other than separable fasteners can be employed to achieve mounting.

While considerable emphasis has been placed herein on the fact that the panel means and border means of the trim panel components are of one piece sheet-like construction wherein the panel means and border means are integral along a portion of the peripheral edge of the panel means and wherein the border means are of channel shape in cross-section, it will be appreciated that the panel means and border means may be otherwise constructed and interrelated in a manner to define unitary panel and border means. For example, the border means of the trim panel components could be of solid construction in cross-section as opposed to having a hollow shaped configuration and, further, the panel portions and border portions could be separately produced and suitably joined such as by adhesive means or under heat and pressure to define a trim panel of unitary structure ready for installation. Moreover, it will be appreciated that the trim panels may have any outer surface configuration which is desired. For example, the outer surface of the border means might well be defined by flat surfaces extending outwardly from the panel means then laterally of the panel means and thence inwardly towards the underlying vehicle panel, as opposed to having a contour defined by arcuate surface portions between the inner and outer legs thereof.

As many possible embodiments of the present invention may be made and as many possible changes may be made in the embodiments herein described, it is to be distinctly understood that the foregoing descriptive matter is to be interpreted simply as illustrative of the present invention and not as a limitation.

I claim:

1. A trim panel adapted to be mounted on the exterior surface of a vehicle panel, said trim panel comprising unitary panel and border means including panel means having a decorable outer surface and a peripheral edge contoured to correspond generally to the peripheral contour of the vehicle panel and border means extending along at least a portion of said peripheral edge and having a decorable outer surface extending from said portion of said peripheral edge toward said vehicle panel when said trim panel is mounted thereon.

2. The trim panel as defined in claim 1, wherein the material of said unitary panel and border means is a plastic.

3. The trim panel as defined in claim 2, wherein said panel means and said border means are integrally united along said portion of said peripheral edge.

4. The trim panel as defined in claim 1, wherein said panel means is in the form of a sheet of substantially uniform thickness and has a cross-sectional contour corresponding substantially to the contour of the exterior surface of said vehicle.

5. The trim panel as defined in claim 1, wherein said panel means includes an inner surface spaced from said exterior surface of the vehicle panel when said trim panel is mounted thereon.

6. The trim panel as defined in claim 4, wherein said border means includes wall means extending from said portion of said peripheral edge and terminating inwardly of the inner surface of said panel means sheet, whereby said inner surface is spaced from said exterior surface of said vehicle panel.

7. The trim panel as defined in claim 6, wherein the material of said panel means and border means is a plastic.

8. The trim panel as defined in claim 7, wherein said panel means and border means are integrally united along said portion of said peripheral edge.

9. The trim panel as defined in claim 1, and decorative means on said outer surfaces of said panel means and border means providing said trim panel with a wood panel and wood border appearance.

10. The trim panel as defined in claim 6, and decorative means on said panel means and border means providing said trim panel with a wood panel and wood border appearance.

11. The trim panel as defined in claim 8, and decorative means on said outer surfaces of said panel means and border means providing said trim panel with a wood panel and wood border appearance.

12. The trim panel as defined in claim 9, wherein said panel and border means is provided with means to facilitate the mounting of said trim panel.

13. The trim panel as defined in claim 8, wherein said panel and border means is provided with means to facilitate the mounting of said trim panel.

14. The trim panel as defined in claim 10, wherein said border means is provided with means to facilitate the mounting of said trim panel.

15. The trim panel as defined in claim 11 wherein said border means is provided with means to facilitate the mounting of said trim panel.

16. A trim panel adapted to be mounted on an exterior surface of a vehicle panel, said trim panel comprising panel and border means of thermoplastic material having an outer peripheral contour corresponding generally to the peripheral contour of said vehicle panel, said panel and border means including a thin panel portion having a decorable outer surface and a peripheral edge and border means integral with said panel portion and extending along at least a portion of said peripheral edge, said border means having a decorable outer surface convexly contoured with respect to said outer surface of said panel portion.

17. A trim panel as defined in claim 16, wherein said border means is channel shaped in cross-section and includes an inner leg portion integral with said panel portion and an outer leg portion adapted to engage the exterior surface of a vehicle panel when said trim panel is mounted thereon.

18. A trim panel as defined in claim 17, wherein said panel portion has a cross-sectional contour corresponding generally to the contour of the underlying exterior surface of the vehicle panel.

19. A trim panel as defined in claim 18, wherein said outer leg portion of said channel is of a length in the direction of said vehicle panel such that said panel portion is spaced from said underlying external surface of the vehicle panel.

20. A trim panel as defined in claim 16, and means on said decorable surfaces of said panel portion and border means providing said trim panel with a wood panel and wood border appearance.

21. A trim panel as defined in claim 19, and means on said decorable surfaces of said panel portion and border means providing said trim panel with a wood panel and wood border appearance.

22. A trim panel as defined in claim 20, wherein said panel and border means is provided with means to facilitate mounting said trim panel.

23. A trim panel as defined in claim 21, wherein said border means is provided with means to facilitate mounting said trim panel.

References Cited

UNITED STATES PATENTS

| | | | |
|---|---|---|---|
| 2,387,317 | 10/1945 | Cunnington | 52—312 X |
| 3,419,458 | 12/1968 | Brooks et al. | 161—121 |
| 3,436,297 | 4/1969 | Brooks et al. | 161—119 |
| 3,452,861 | 7/1969 | Erwin | 161—413 X |
| 3,458,386 | 7/1969 | Shanok et al. | 161—121 |
| 3,471,355 | 10/1969 | Truesdell et al. | 161—106 X |
| 3,654,062 | 4/1972 | Loew | 161—119 |

FOREIGN PATENTS

| | | | |
|---|---|---|---|
| 1,163,735 | 9/1969 | Great Britain | 161—123 |

WILLIAM A. POWELL, Primary Examiner

U.S. Cl. X.R.

161—48, 54, 118, 119, 413